United States Patent
Yu

(10) Patent No.: US 9,336,308 B2
(45) Date of Patent: *May 10, 2016

(54) METHODS, SYSTEMS, AND COMPUTER PROGRAM PROUCTS FOR CATEGORIZING/RATING CONTENT UPLOADED TO A NETWORK FOR BROADCASTING

(71) Applicant: AT&T Intellectual Property I, LP, Atlanta, GA (US)

(72) Inventor: Ke Yu, Alpharetta, GA (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 99 days.

This patent is subject to a terminal disclaimer.

(21) Appl. No.: 13/957,595

(22) Filed: Aug. 2, 2013

(65) Prior Publication Data

US 2013/0318087 A1    Nov. 28, 2013

Related U.S. Application Data

(63) Continuation of application No. 11/650,277, filed on Jan. 5, 2007, now Pat. No. 8,677,409.

(51) Int. Cl.
*H04N 21/23* (2011.01)
*G06F 17/30* (2006.01)
*H04N 7/16* (2011.01)
*H04N 21/233* (2011.01)
*H04N 21/234* (2011.01)
*H04N 21/266* (2011.01)
*G10L 15/18* (2013.01)

(52) U.S. Cl.
CPC ............ *G06F 17/3074* (2013.01); *H04N 7/165* (2013.01); *H04N 21/233* (2013.01); *H04N 21/23418* (2013.01); *H04N 21/26603* (2013.01); *G10L 15/1815* (2013.01)

(58) Field of Classification Search
None
See application file for complete search history.

(56) References Cited

U.S. PATENT DOCUMENTS

| 4,930,160 | A | 5/1990 | Vogel |
| 5,973,683 | A | 10/1999 | Cragun et al. |
| 6,061,056 | A | 5/2000 | Menard |
| 6,408,128 | B1 | 6/2002 | Abecassis |
| 6,675,384 | B1 | 1/2004 | Block et al. |
| 6,774,926 | B1 * | 8/2004 | Ellis et al. ................. 348/14.01 |
| 7,200,852 | B1 | 4/2007 | Block |
| 2001/0047266 | A1* | 11/2001 | Fasciano ..................... 704/278 |
| 2002/0093591 | A1* | 7/2002 | Gong et al. .................. 348/515 |
| 2003/0126267 | A1 | 7/2003 | Gutta et al. |
| 2004/0068399 | A1* | 4/2004 | Ding .................... G10L 21/038 704/200.1 |
| 2005/0060404 | A1 | 3/2005 | Ahlander et al. |
| 2005/0091271 | A1 | 4/2005 | Srinivas et al. |
| 2005/0149967 | A1 | 7/2005 | Hanley et al. |
| 2008/0120636 | A1* | 5/2008 | Gahman ....................... 725/28 |

* cited by examiner

*Primary Examiner* — Cai Chen

(74) *Attorney, Agent, or Firm* — Guntin & Gust, PLC; Joseph P. Hrutka

(57) ABSTRACT

Methods, systems, and computer program products that automatically categorize and/or assign ratings to content (video and audio content) uploaded by individuals who want to broadcast the content to others via a communications network, such as an IPTV network, are provided. When an individual uploads content to a network, a network service automatically extracts an audio stream from the uploaded content. Words in the extracted audio stream are identified. For each identified word, a preexisting library of selected words is queried to determine if a match exists between words in the library and words in the extracted audio stream. The selected words in the library are associated with a particular content category or content rating. If a match exists between an identified word and a word in the library, the uploaded content is assigned a content category and/or rating associated with the matched word.

20 Claims, 3 Drawing Sheets

METHODS, SYSTEMS, AND COMPUTER PROGRAM PROUCTS FOR CATEGORIZING/RATING CONTENT UPLOADED TO A NETWORK FOR BROADCASTING

CROSS-REFERENCE TO RELATED APPLICATIONS

This application is a continuation of U.S. patent application Ser. No. 11/650,277 filed Jan. 5, 2007, which is incorporated herein by reference in its entirety.

FIELD OF THE DISCLOSURE

The present invention relates generally to content and, more particularly, to uploading content to a network such as an Internet Protocol television network.

BACKGROUND OF THE DISCLOSURE

Internet Protocol television (IPTV) is a method of distributing television content over IP that enables a more customized and interactive user experience. For example, IPTV may allow people separated geographically to watch a movie together, while chatting and exchanging files simultaneously. Conventionally, IPTV uses a two-way broadcast signal transmitted through a provider's backbone network and servers, allowing viewers to select content on demand. Viewers utilize a broadband connection and a set-top box to send and receive requests. An exemplary IPTV platform is Microsoft TV IPTV Edition™ available from Microsoft Corporation, Redmond, Wash. Microsoft TV IPTV Edition is an integrated and comprehensive software platform developed specifically to deliver broadcast-quality video and new, integrated TV services over broadband networks.

Because of its two-way full duplex communication capability, IPTV provides individuals with the ability to publish and broadcast personal video content. Unfortunately, the ability of individuals to publish and broadcast personal content raises concerns that offensive content may be published and broadcast. In the conventional television industry, content is tightly monitored and screened by content and service providers. However, in the IPTV industry, there are currently no procedures or entities for controlling and screening content published and broadcast by individuals.

Embodiments of the present invention provide methods, systems, and computer program products that automatically categorize and/or assign ratings to content (video and audio content) uploaded by individuals who want to broadcast the content to others via a communications network, such as an IPTV network. According to embodiments of the present invention, when an individual uploads content to a network, a network service automatically extracts an audio stream from the uploaded content. Words (e.g., spoken works, music-lyrics, etc.) in the extracted audio stream—are identified. For each identified word, a preexisting library of selected words is queried to determine if a match exists between words in the library and words in the extracted audio stream. The selected words in the library are associated with a particular content category or content rating (e.g., offensive content). If a match exists between an identified word and a word in the library, the uploaded content is assigned a content category and/or rating associated with the matched word. For example, if a word match exists with a word known to be associated with offensive content, an "offensive content" rating is assigned to the content such as, for example, one of the film ratings (e.g., R or NC-17) assigned by the Motion Picture Association of America (MPAA). According to some embodiments of the present invention, an assigned category/rating may be embedded within metadata associated with the uploaded content. Embodiments of the present invention, thus, provide a transparent process of screening and controlling content uploaded to a network such as an IPTV network.

Other methods, apparatus and/or computer program products according to embodiments of the invention will be or become apparent to one with skill in the art upon review of the following drawings and detailed description. It is intended that all such additional methods, apparatus, and/or computer program products be included within this description, be within the scope of the present invention, and be protected by the accompanying claims.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE DRAWINGS

Figure 1:
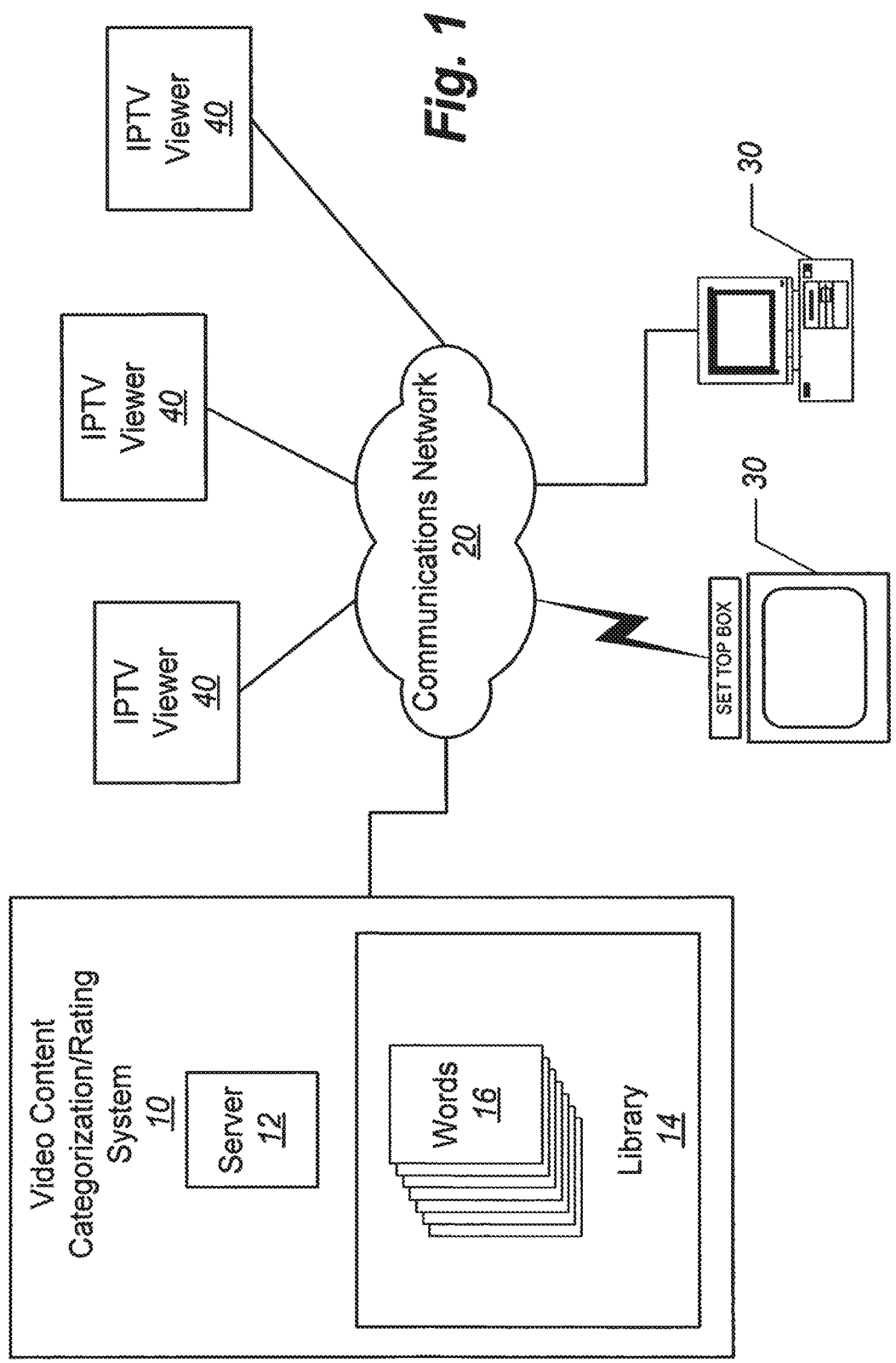
FIG. 1 is a block diagram that illustrates a network service for categorizing and/or rating video content uploaded to a communications network for broadcasting, according to some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more of the features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. Embodiments of the present invention are not limited to a particular programming language. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for selecting advertisements for insertion into advertising slots in broadcast content, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

As used herein, the terms "content" and "broadcast content" are interchangeable and are intended to mean any type of content (both audio content and video content) that can be published and broadcast via IPTV. For example, content may include television programs, video files, radio programs, movies, voice messages, music and other audio files, electronic mail/messages, web pages, etc.

The present invention is preferably practiced within a client/server programming environment. As is known by those skilled in this art, client/server is a model for a relationship between two computer programs in which one program, the client program, makes a service request from another program, the server program, which fulfills the request. Relative to the Internet, a Web browser is a client program that requests services (the sending of Web pages or files) from a Web server (which technically is called a Hypertext Transport Protocol or HTTP server) in another computer somewhere on the Internet.

FIG. 1 is a block diagram that illustrates an exemplary network service 10 configured to categorize and/or rate content uploaded to a communications network 20 for broadcasting, according to some embodiments of the present invention. The communication network 20 may be the Internet, an intranet or other private communication network. According to some embodiments of the present invention, the communication network 20 is an IPTV network or other video system/network that allows individuals to upload and publish content via a user device 30. User device 30 represents any type of device that is configured to upload content including, but not limited to, interactive televisions, such as WebTVs, wireless communications devices (e.g., personal digital assistants (PDAs), hand-held computers, set-top boxes, Internet-ready phones), etc. User devices 30 may be connected to the communication network 20 in any of various ways including, but not limited to, broadband connections, wireless connections, wireline connections, etc. Moreover, embodiments of the present invention are not limited to IPTV. For example, communication network 20 may be any type of video system such as, for example, Google™ video, YouTube™, etc.

The network service 10 includes a server 12 and a library (e.g., a database, etc.) 14 of selected words 16 that are considered to be indicative of a type or category of content with which they are used (e.g., sports-related content, offensive content, etc.). Each word in the library is associated with a particular content category and/or may include a rating associated therewith. For example, words in the library 14 that may be tagged as offensive words include, but are not limited to, words associated with pornography, hate-mongering, racism, illicit drug use, terrorism and/or other illegal behavior.

An individual who wants to upload and broadcast content via the communications network 20 initially accesses a web interface served by server 12 of the network service and, via the web interface, uploads the content to the network service 10 via a user device 30. Embodiments of the present invention, however, are not limited to web-based applications. Embodiments of the present invention can be either a web-based application or a native application (e.g., Windows™-based, Linux-based, etc.) as long as the application is capable to communicate with a remote server over network protocols like HTTP or TCP/IP, etc.

Figure 2:
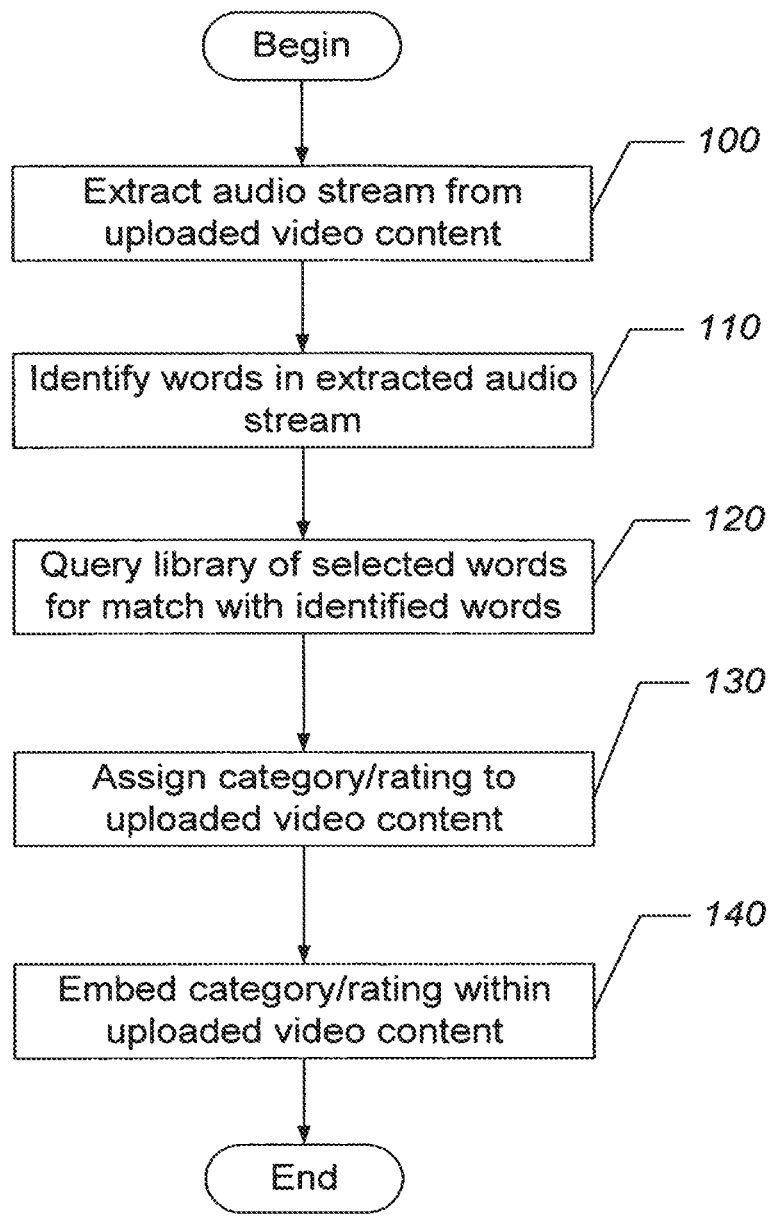
FIG. 2 is a flow chart that illustrates exemplary operations for categorizing/rating video content uploaded to a communications network for broadcasting, according to some embodiments of the present invention.

Referring to FIG. 2, once an individual uploads content via communications with the server 12, the server, or one or more applications called by the server, implements the operations described below to categorize/rate the uploaded content. Initially, an audio stream is extracted from uploaded content (Block 100). As is known to those skilled in the art of the present invention, encoded videos contain one or more synchronized video streams and audio streams. Before decoding, they can be split into multiple individual streams (video only and audio only). Software applications, such as Microsoft®. Directshow®., for example, provide a splitter/filter to extract audio streams from uploaded video.

Next, text or words in the extracted audio stream are identified (Block 110). Word identification may be performed in various ways. According to some embodiments of the present invention, an algorithm, such as Microsoft®. Speech SDK, that converts the audio stream to some form of voice or text pattern may be used. Sometimes, the audio elements in a video content may not be related to text such as excessive explosion noise or extremely loud music etc. Embodiments of the present invention include these sound patterns in the library 14 for pattern recognition. Some embodiments of the present invention may include algorithms for extracting words from lyrics associated with music audio streams extracted from video content. Many digital music files are encoded with lyrics as part of the metadata in the audio stream. The metadata can be read out once the audio stream is extracted. Therefore, the lyrics would be readily available for music ratings etc.

For each identified word, the library 14 is queried to determine if a match exists between the identified word and words stored within the library 14 (Block 120). If a match exists, the uploaded content is assigned a content category and/or rating (Block 130). For example, if the identified words are sufficient to indicate a category of the content (e.g., the content relates to sports, to history, to current events, etc.) a category may be assigned to the content. The identified words may also indicate that the content may be considered offensive content and, if so, a rating may be assigned to the content such as, for example, the rating assigned by the Motion Picture Association of America (MPAA). MPAA ratings are set forth below in Table 1.

TABLE 1

| Rating | Definition |
|---|---|
| G | All ages admitted. This signifies that the film rated contains nothing most parents will consider offensive for even their youngest children to see or hear. Nudity, sex scenes, and scenes |

TABLE 1-continued

| Rating | Definition |
|---|---|
| | of drug use are absent; violence is minimal; snippets of dialogue may go beyond polite conversation but do not go beyond common everyday expressions. |
| PG | Some material may not be suitable for children. This signifies that the film rated may contain some material parents might not like to expose to their young children - material that will clearly need to be examined or inquired about before children are allowed to attend the film. Explicit sex scenes and scenes of drug use are absent; nudity, if present, is seen only briefly, horror and violence do not exceed moderate levels. |
| PG-13 | Some material may be inappropriate for children under 13. This signifies that the film rated may be inappropriate for pre-teens. Parents should be especially careful about letting their younger children attend. Rough or persistent violence is absent; sexually-oriented nudity is generally absent; some scenes of drug use may be seen; one use of the harsher sexually derived words may be heard. |
| R | Content definitely contains some adult material. An R-rated film may include strong language, violence, nudity, drug abuse, other elements, or a combination of the above. |
| NC-17 | Content that most parents will consider patently too adult for their youngsters under 17. An NC-17 rating can indicate excessive violence, sex, aberrational behavior, drug abuse or any other elements which, when present, most parents would consider too strong and therefore off-limits for viewing by their children. |

According to some embodiments of the present invention, an assigned category/rating may be embedded within the uploaded content (Block 140). For example, an assigned content category and/or rating may be inserted within metadata associated with the uploaded content.

Figure 3:
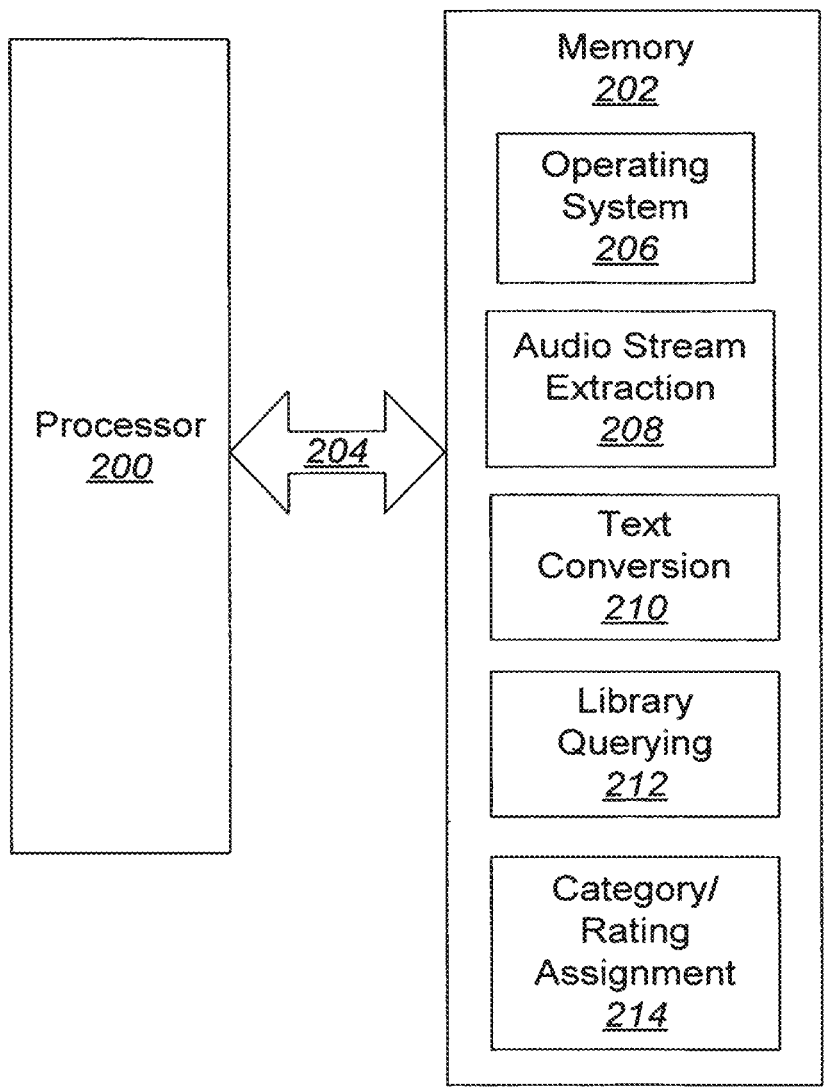
FIG. 3 is a block diagram that illustrates a processor and a memory hosted by a device that serves the function of a network service that categorizes/rates video content uploaded to a communications network for broadcasting, according to some embodiments of the present invention.

FIG. 3 illustrates a processor 200 and a memory 202 hosted by a device that serves the function of a network service 10 (FIG. 1) and that may be used in embodiments of methods, systems, and computer program products that categorizes and/or rates content uploaded to a communications network for broadcasting. The processor 200 communicates with the memory 202 via an address/data bus 204. The processor 200 may be, for example, a commercially available or custom microprocessor. The memory 202 is representative of the overall hierarchy of memory devices containing the software and data used to execute operations for selecting advertisements for insertion within content as described herein, in accordance with some embodiments of the present invention. The memory 202 may include, but is not limited to, the following types of devices: cache, ROM, PROM, EPROM, EEPROM, flash, SRAM, and DRAM.

As shown in FIG. 3, the memory 202 may hold various categories of software and data: an operating system 206, audio stream extraction application 208, text conversion application 210, library querying application 212, and category/rating assignment application 214. The operating system 206 controls operations of the device that serves the function of the server 12. In particular, the operating system 206 may manage a device's resources and may coordinate execution of various programs (e.g., the audio stream extraction application, text conversion application, library querying application, category/rating assignment application, etc.) by the processor 200.

The audio stream extraction application 208 comprises logic for extracting an audio stream or streams from uploaded content. The text conversion application 210 comprises logic for identifying words within an extracted audio stream. This may include spoken words, lyrics from performed music, etc. The library querying application 212 comprises logic for querying words stored within a library (14, FIG. 1) to determine if a match exists between identified words in an extracted audio stream and words stored within the library. The category/rating assignment application 212 comprises logic for assigning a content category and/or rating to uploaded content. The category/rating assignment application 212 may also include logic for embedding an assigned category/rating within uploaded video content (e.g., within metadata associated with the uploaded video content).

The various applications of the network service 10 may execute entirely on the server 12 (or on other data processing systems in communication with the server 12), or partly on the server 12 and partly on a user's device 30.

FIGS. 1-3 illustrate the architecture, functionality, and operations of some embodiments of methods, systems, and computer program products for a network service that categorizes and/or rates video content uploaded to a communications network for broadcasting. In this regard, each block represents a module, segment, or portion of code, which comprises one or more executable instructions for implementing the specified logical function(s). It should also be noted that in other implementations, the function(s) noted in the blocks may occur out of the order noted in FIG. 2. For example, two blocks shown in succession may, in fact, be executed substantially concurrently or the blocks may sometimes be executed in the reverse order, depending on the functionality involved.

Due to the diversity of video content and limitations of current voice recognition technology, it may be difficult to accurately rate some video content. Embodiments of the present invention can include means to generate notifications and recommendations on ratings for operators where human intervention is required in difficult cases. Technologies like existing pattern recognition and machine learning can be employed for this purpose. For example, a categorizing/rating engine (e.g., 10, FIG. 1) can be configured to learn from patterns from past experience and improve future rating accuracy. Operators may have content managers to monitor and train the categorizing/rating engine.

Many variations and modifications can be made to the preferred embodiments without substantially departing from the principles of the present invention. All such variations and modifications are intended to be included herein within the scope of the present invention, as set forth in the following claims.

What is claimed is:

1. A device, comprising:
a processor; and
a memory that stores executable instructions that, when executed by the processor, facilitate performance of operations, comprising:
extracting an audio stream from uploaded content to obtain an extracted audio stream, wherein the uploaded content is uploaded to a communications network for broadcasting;
identifying words within the extracted audio stream, wherein the words include spoken words and musical lyrics, wherein the musical lyrics are provided in metadata of the extracted audio stream;
identifying non-speech sounds within the extracted audio stream;
querying words stored within a library to determine whether a match exists between identified words in the extracted audio stream and words stored within the library, wherein the library stores a plurality of words, wherein the library is provided by a network service operating on the communications network, and wherein each word of the plurality of words stored in the library has a content category or content rating assigned thereto;
querying non-speech sound patterns stored within the library to detect a match between identified non-speech sounds in the extracted audio stream and non-speech sound patterns stored within the library;
assigning a content category or a content rating to the uploaded content in accordance with a match between the identified words and the words stored within the library as an assigned word content category; and
assigning a content category or a content rating to the uploaded content in accordance with a match between the identified non-speech sounds and the non-speech sound patterns stored within the library as an assigned non-speech sound content category.

2. The device of claim 1, wherein the operations further comprise embedding one of the assigned word content category and the assigned non-speech sound content category within metadata associated with the uploaded content.

3. The device of claim 2, wherein the metadata comprises a digital music file encoded with the musical lyrics, and wherein the content rating comprises a music rating.

4. The device of claim 2, wherein the uploaded content comprises video content, and wherein one of the assigned content word category and the assigned non-speech sound content category is embedded within uploaded video content.

5. The device of claim 1, wherein the memory comprises an audio stream extraction application, a text conversion application, a library querying application, and a category assignment application for execution by the processor.

6. The device of claim 1, wherein the operations further comprise selecting an advertisement for insertion within the content.

7. The device of claim 1, wherein an identified word is associated with offensive material, and wherein the operations further comprise assigning a content rating that identifies that the content may contain offensive material.

8. The device of claim 1, wherein the operations further comprise performing pattern recognition for the identified non-speech sounds.

9. The device of claim 1, wherein the operations further comprise generating a notification that human intervention is required for assigning a content rating.

10. A network service operating on a communications network, comprising:
a library of a plurality of selected words indicative of a category of content, each word being associated with a particular content category and a content rating; and
a server comprising a memory to store instructions and a processor coupled to the memory, wherein responsive to executing the instructions, the processor performs operations comprising:
extracting an audio stream from content uploaded to the communications network to obtain an extracted audio stream;
identifying words in the extracted audio stream, wherein the words in the extracted audio stream include musical lyrics provided in metadata of the extracted audio stream;
identifying non-speech sounds in the extracted audio stream;
querying the library to determine whether a match exists between identified words in the extracted audio stream and words stored in the library;

detecting a match between identified non-speech sounds and non-speech sound patterns stored in the library; and assigning a content category or a content rating to the content in accordance with a match between the identified words and the words stored in the library, wherein the identifying comprises converting the audio stream to a voice pattern or a text pattern.

11. The network service of claim 10, wherein the network is an internet protocol television network, and wherein the content is uploaded to the network via a user device.

12. The network service of claim 11, wherein the operations further comprise serving a web interface accessed by the user device, and wherein the content is uploaded via the web interface.

13. The network service of claim 10, wherein the operations further comprise performing pattern recognition for the identified non-speech sounds.

14. The network service of claim 10, wherein the audio stream is extracted from video content, and wherein the operations further comprise extracting words from lyrics associated with music in the audio stream.

15. The network service of claim 14, wherein the operations further comprise embedding the content category or content rating within metadata associated with the content, wherein the metadata comprises a digital music file encoded with the lyrics, and wherein the content rating comprises a music rating.

16. A method, comprising:

extracting, by a server comprising a processor, an audio stream from content uploaded to a communications network via a web interface;

identifying, by the server, words in the audio stream, wherein the words in the audio stream include musical lyrics provided in metadata of the audio stream;

identifying, by the server, non-speech sounds in the audio stream;

querying, by the server, a library of selected words indicative of a category of content, each word being associated with a particular content category and a content rating, to determine whether a match exists between identified words in the audio stream and the words in the library, wherein the library stores a plurality of words, and wherein the library is provided by a network service operating on the communications network;

detecting, by the server, a match between identified non-speech sounds and non-speech sound patterns in the library; and assigning, by the server, a content category or a content rating to the content in accordance with a match between the identified words and the words in the library as an assigned content category or content rating, wherein the content is for broadcasting on the communications network.

17. The method of claim 16, further comprising embedding the assigned content category or content rating within metadata associated with the content.

18. The method of claim 17, further comprising extracting words from lyrics associated with music in the audio stream, wherein the metadata comprises a digital music file encoded with the lyrics, and wherein the content rating comprises a music rating.

19. The method of claim 16, wherein the content is uploaded from a user device accessing the web interface, the user device comprising an interactive television, a personal digital assistant, a hand-held computer a set-top box, or an Internet-ready phone.

20. The method of claim 16, wherein the communication network is an internet protocol television network.

* * * * *

UNITED STATES PATENT AND TRADEMARK OFFICE
CERTIFICATE OF CORRECTION

| | | |
|---|---|---|
| PATENT NO. | : 9,336,308 B2 | Page 1 of 1 |
| APPLICATION NO. | : 13/957595 | |
| DATED | : May 10, 2016 | |
| INVENTOR(S) | : Ke Yu | |

It is certified that error appears in the above-identified patent and that said Letters Patent is hereby corrected as shown below:

Title Page, Item (54) and in the Specification, Column 1, Title, please delete "PROUCTS" and insert --PRODUCTS-- therefor;

In the Claims

Column 10, line 31 (Claim 19), after "computer" please insert --,--.

Signed and Sealed this
Twenty-eighth Day of June, 2016

Michelle K. Lee
*Director of the United States Patent and Trademark Office*